Patented Feb. 7, 1939

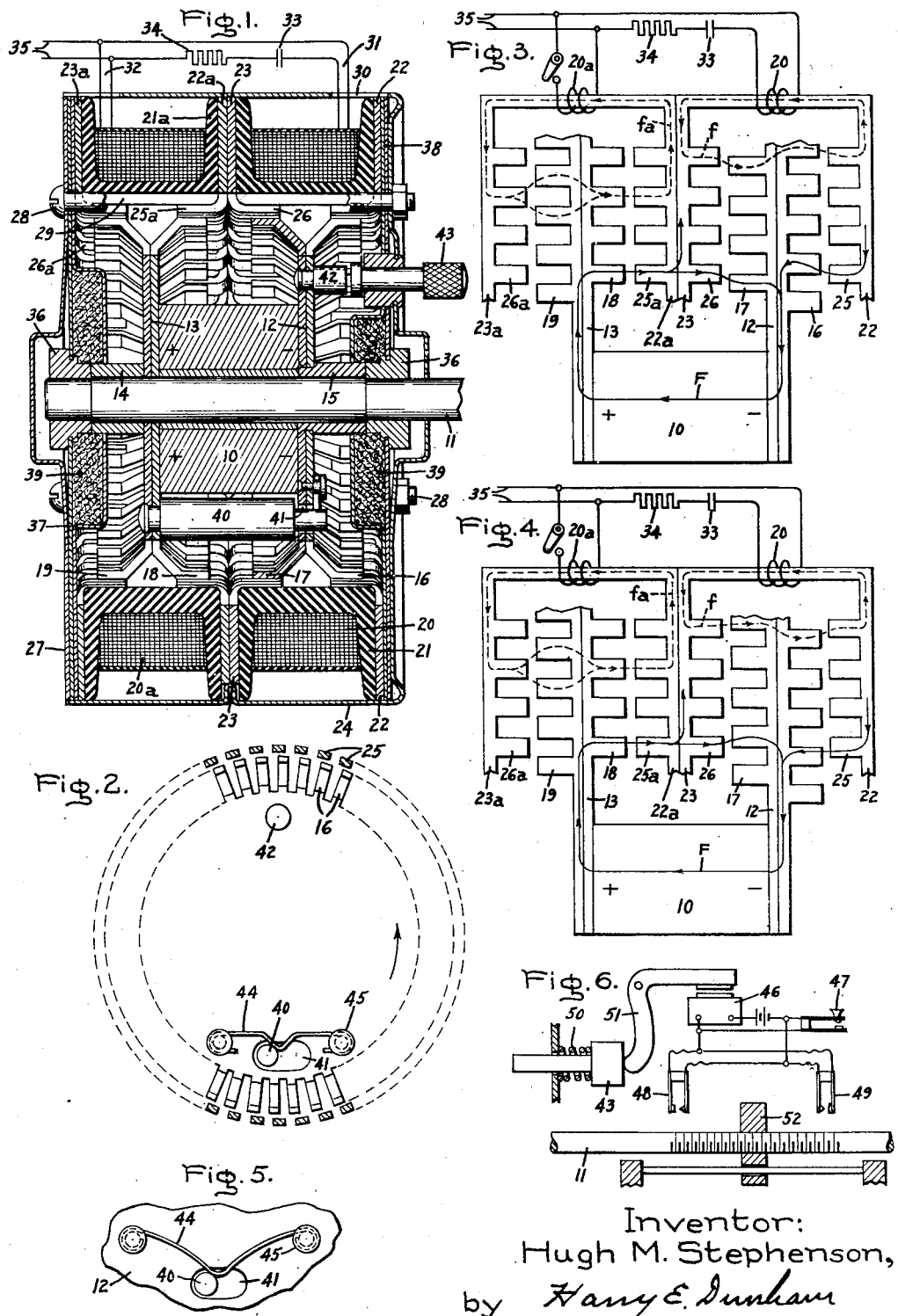

2,146,603

UNITED STATES PATENT OFFICE 2,146,603

REVERSIBLE INDUCTOR MOTOR

Hugh M. Stephenson, Fort Wayne, Ind., assignor to General Electric Company, a corporation of New York Application June 24, 1938, Serial No. 215,642

7 Claims. (Cl. 172—120)

My invention relates to an electric motor which is reversible by mechanical means. The motor may be made self-reversing after a predetermined extent of rotation in opposite directions to obtain an oscillatory motion or it may be reversed at will by the simple mechanical expedient of blocking rotation of one part of the rotor.

In my invention I employ a two-phase synchronous inductor motor of the type described in Welch application, Serial No. 162,893, filed Sept. 8, 1937, which has matured into Patent No. 2,122,307, June 28, 1938, assigned to the same assignee as the present invention. I have found that if one of the rotor elements of such a motor be loose on its shaft so as to permit a limited amount of rotation between the two rotor elements, the motor may be reversed in a reliable manner by simply rotating one rotor element with respect to the other by the distance of one-half the tooth spacing or some uneven multiple of such distance, and that this reversing operation may be performed automatically and powered by the motor itself through a lost motion driving connection between the different rotor elements.

The features of my invention which are believed to be novel and patentable will be pointed out in the claims appended hereto. For a better understanding of my invention reference is made in the following description to the accompanying drawing in which Fig. 1 shows a sectional view of a motor embodying my invention taken through the stator and rotor on the axis of rotation; Fig. 2 is a partial end view of the motor and principally of the right end of the rotor of Fig. 1 as it would appear with the end shield and bearing housing removed; Fig. 3 is a schematic showing of the stator and rotor tooth relationship of the motor and the magnetic connections between different sections thereof when adjusted for one direction of rotation; Fig. 4 is a similar view when adjusted for the opposite direction of rotation; Fig. 5 is a detail view of one form of reversing coupling that may be used between different parts of the rotor; and Fig. 6 shows an electomagnet reversing control system.

Referring first to Figs. 1 and 3, it will be seen that the present motor is made up of two single phase motor elements placed side by side and having a common permanent magnet 10 on the rotor for supplying the unidirectional flux excitation for both elements. The rotor and stator teeth belonging to one phase are segregated from the rotor and stator teeth belonging to the other phase.

The shaft 11 of the motor passes through a central bore of the cylindrical shaped permanent magnet 10. Abutting against opposite ends of the permanent magnet are magnetic spider elements 12 and 13. Each such spider is shown made up of two disc-shaped plates concentric with shaft 11. Bushing 14, spider 13 and the permanent magnet 10 are secured to the shaft 11. Spider 12 is secured to bushing 15 which is loose on the shaft 11. When the parts are assembled, the spider elements 13 and the permanent magnet 10 are securely held to the shaft and in abutting relationship. Spider 12 also abuts against the permanent magnet such that one spider 12 is polarized as a south pole and the other spider 13 as a north pole by the permanent magnet 10. The peripheral edges of the spider elements have evenly spaced teeth cut therein, and the ends of these teeth are bent parallel to the shaft to form four circular axially spaced rows of rotor teeth; the teeth in the outer plate of spider 12 are bent outward to form the row of teeth 16, the teeth of the inner plate of spider 12 are bent inwardly to form the row of rotor teeth 17. At the opposite end of the rotor the teeth of the inner plate of spider element 13 are bent inwardly to form the row of rotor teeth 18, and the teeth in the outer plate of spider element 13 are bent outwardly to form the row of rotor teeth 19. As indicated in the schematic diagram of Fig. 3 the teeth of spider 12 which are bent in the opposite directions are alternately spaced, that is, teeth 16 lie between teeth 17. Fig. 3 is intended to show the spaced relationship between the various teeth in stator and rotor for one direction of rotation and, whereas actually adjacent, stator and rotor teeth overlap in the axial direction as shown in Fig. 1. The teeth are shown shorter in Fig. 3 in order to avoid confusion. Also the stator and rotor teeth as seen in Fig. 3 are represented as being laid out on a flat surface, whereas actually they are arranged in cylindrical formation. Likewise teeth 18 and 19 of spider element 13 alternate in staggered relationship. It will further be noted that the teeth 16 and 17 of rotor spider element 12 are shifted ¼ tooth pitch in a given direction with respect to rotor teeth 18 and 19 respectively of rotor spider element 13.

The single phase stator element cooperating with rotor spider element 12 comprises an annular shaped single phase coil 20 on an insulating spool 21 within a partially closed magnetic shell made up of washer shaped plates 22 and 23 and an outer magnetic cup 24. The stator parts form a cylinder about the rotor and are concentric therewith and with its shaft. The coil is incased except at its inner periphery by magnetic material. The plates 22 and 23 have teeth cut in their inner peripheries which teeth are bent towards each other and parallel to the rotor teeth and lie closely adjacent thereto so that aligned rows of stator and rotor teeth are separated by a small concentric air gap. The teeth of plate 21 form the row of stator teeth designated 25 adjacent and opposite the row of rotor teeth 16. The teeth of plate 23 form the row of stator teeth 26 adjacent and opposite rotor teeth 17. The teeth 25 and 26 are separated sufficiently in the axial direction, so that the single phase flux that tends to pass between them, when coil 20 is energized, does so through the adjacent rows of rotor teeth 16 and 17.

The other single phase stator element is similar to the one just described and its corresponding parts are designated by like reference characters followed by the letter a. The outer magnetic shell 24 is common to both stator elements and is in the form of a cup with its end wall to the right in Fig. 1 enclosing that end of the motor. The left end of the motor is enclosed by a suitable cover plate 27.

It will be noted from Fig. 3 that each row of stator teeth have the same pitch or spacing as the teeth in the rotor, but that the stator teeth in all rows 25, 26, 25a and 26a are in axial alignment. So far as operation of the motor is concerned we might align the rotor teeth and offset the stator teeth or provide some intermediate equivalent variation, but it is preferred to align the stator teeth in the different rows for mechanical considerations. The chief reason for this is that three or more bolts 28 are provided between the outer end wall plates 27 and 24 of the motor casing to hold all of the parts together in assembled relationship. By axially aligning all of the stator teeth in the various rows these bolts, which are made of non-magnetic material, can be run through the motor assembly and lie in certain aligned slots between the stator teeth in the different rows. At the points where these bolts pass through the motor a groove 29 may be cut in the inner periphery of the insulating spools 21 and 21a, if necessary.

An opening, or openings, 30 are cut in the stator shell 24 to bring out the leads 31 and 32 for the coils 20 and 20a. A condenser 33 or other phase-splitting element is included in the circuit of one coil 20, so that the single phase fluxes of the two motor elements are 90 degrees out of phase. Also included in series with the condenser circuit to coil 20 is a resistance 34. This resistance is not essential but is provided so that both coils 20 and 20a may be made exactly alike and carry the same current values. The circuits for the two coils are connected in parallel to a single phase source 35.

The bearings 36 of the motor are made of porous bronze and are secured by staking them to flexible circular diaphragm plates 37, extending over the ends of the motor, and centered by fitting snug into the casing 24. These diaphragms are supported, except near the bearing, by side plates comprising the end wall of the outer cup member 34, and outer end plate 27, previously mentioned and by inner plates 37. These supporting plates are flared away from the bearings to allow room for the bearings and for oil retaining absorbent pads 39 about the bearings. By reason of the flexibility of the bearing supporting diaphragms 37 adjacent the bearings the latter are self-aligning.

In the construction of the motor, care should be taken to avoid providing a good magnetic circuit through the bearings and adjacent end walls and shaft structure, as this would divert useful flux from the air gap between stator and rotor teeth. To this end the shaft 11 and retaining bushings 14 are made of non-magnetic material. The plates 37 and 38 may likewise be made of non-magnetic material, although this is not essential.

The air gap reluctance of this motor is the same in all rotor positions. For example, in the rotor position represented in Fig. 3, teeth 25a and 18 are in alignment, and ½ of a tooth 17 covers ½ of a tooth 26. Also ½ of a tooth 16 covers ½ of a tooth 25. The tooth area in alignment between stator and rotor is, therefore, the area of ½ of the area of all stator teeth. This is true in any other rotor position as will be evident by considering such area when the rotor is shifted to any other position. The motor, therefore, has no standstill locking tendency due to the rotor attempting to find a position where the reluctance between stator and rotor is less than it is in some other position. Also the stator and rotor tooth area in alignment is always the same in both ends of the motor whatever the rotor position, and hence there is no magnetic unbalance axially of the motor, a feature which is desirable from the standpoint of quiet operation. The path for the flux of the permanent magnet 10 through the rotor is a path of constant reluctance in all rotor positions, and hence there is no tendency for the permanent magnet to become deenergized because of variation in the reluctance of its flux path and hence its flux. This path is represented generally by the full line F, Fig. 3 for the rotor position indicated. The reluctance of the paths for the alternating fluxes produced by the windings 20 and 20a, between stator and rotor, is constant in all rotor positions. These flux paths are represented generally by dotted lines f and fa in Fig. 3. The directions of the arrows on these dotted flux lines have no particular significance, because the alternating fluxes reverse and also have maximum values at different times when the phase-splitting arrangement is employed.

In order to explain the operation of this motor, I will first assume that the two ends of the rotor remain in the relation shown in Fig. 3, also let it be assumed first that only alternating current coil 20a is energized, and that the right-hand half of the motor then merely serves as a return path for the dc or unidirectional flux. When the ac flux is in the direction represented by the arrows fa, it adds with the dc flux between teeth 25a and 18 and subtracts or opposes any dc flux tending to cross between teeth 26a and 19. Under this condition the rotor will thus seek the position shown with teeth 25a and 18 in alignment, and there will be a maximum resultant flux between the latter teeth and a negligible resultant flux between teeth 26a and 19. A half cycle later the ac flux fa reverses, and then the fluxes will add between teeth 26a and 19, and subtract between teeth 25a and 18. The rotor will then tend to move ½ tooth pitch in either direction so as to bring teeth 19 into alignment with teeth 26a.

The motor with only one coil energized is a single phase self-starting synchronous motor operating on the inductor principle, which may start in either direction of rotation.

If now we consider coil 20a deenergized and only ac coil 20 energized, the right half of the motor combination will comprise a similar self-starting synchronous motor which may start in either direction of rotation. Either end of the motor may be operated alone in this way.

If now both ac coils of the motor be energized simultaneously from the single phase supply 35, the motor will be synchronous and self-starting as before, but with the tooth arrangement of Fig. 3 will operate in a predetermined direction of rotation, such direction depending upon the relative direction in which the coils 20 and 20a are wound or energized and on the direction of phase shift. Assuming these coils are wound or energized in the same relative direction, the flux of coil 20, which leads the flux of coil 20a by 90 degrees due to condenser 33, will occur in the direction indicated by arrow f, 90 electrical degrees time phase before flux fa occurs in the direction indicated.

Flux f, combining with the dc flux, will align teeth 17 and 26. 90 degrees time phase later fa flux will combine with the dc flux to align teeth 18 and 25a. 90 degrees time phase later the reversed f flux will combine with the dc flux to align teeth 25 and 16, and 90 degrees time phase later reversed fa flux will combine with the dc flux to align teeth 26a and 19. Owing to the ¼ tooth pitch between the teeth 16 and 18, and between teeth 17 and 19 directional rotation is assured. For example, as described above and as pictured in Fig. 3, flux fa is assumed to be at its maximum in the direction indicated causing the alignment of teeth 25a and 18. This places teeth 16 nearer teeth 25 in the downward direction of rotor movement than in the upward direction of rotation as visualized in Fig. 3 and hence, since the next effective combined flux pulsation will occur between teeth 25 and 16, the direction of rotation will be downward as indicated. If coil 20 be considered reversed such next effective combined flux pulsation would have occurred between teeth 17 and 26, and direction of rotation would be reversed. Thus we have a self-starting synchronous motor combination consisting of two single phase inductor motors having their unidirectional fluxes supplied by the same permanent magnet. This motor combination will start and operate in a definite direction and this direction of rotation may be reversed by reversing either coil 20 or 20a, or by shifting the phase splitting element from one coil to the other, or mechanically in accordance with the present invention by shifting one of the stator or rotor elements with respect to the other by ½ tooth pitch.

The synchronous speed at which the motor will operate depends upon the frequency and the number of stator and rotor teeth. Increasing the number of teeth reduces the speed, and vice versa. The rotor moves one full tooth pitch per complete cycle at synchronous speed. A motor having 30 teeth in one rotor section will have a synchronous speed of 120 R. P. M. at 60 cycles. The design thus lends itself to considerable flexibility with respect to the features above explained.

Fig. 4 is similar to Fig. 3 with the exception that spider element 12 has been shifted with respect to the spider element 13 and with respect to the stator by one-half tooth pitch, and the flux lines entering and leaving the teeth of spider element 12 have been shifted accordingly. This result is brought about by reason of spider 12 being rotatable on shaft 11 with respect to the remainder of the rotor between limits determined by an annular slot 41 in spider 12 (see Fig. 2) into which a pin 40 secured to the remainder of the rotor extends. Pin 40 is riveted to spider element 13 and has a reduced portion extending freely through slot 41. When the pin is in one end of the slot, the toothed relation is as represented in Fig. 3 for a given rotor position and when the pin 40 is in the opposite end of slot 41, the toothed relation is as represented in Fig. 4. In Fig. 4 the direction of rotation will be reversed as compared to Fig. 3 by reason of this relative shift in the position of spider element 12.

In Fig. 4 the f—a and d—c flux has just aligned teeth 18 and 25a. The next effective flux shift will occur between teeth 16 and 25 and since the rotor teeth 16 are now nearest teeth 25 for a movement of the rotor in the upward direction, the rotor will move upward as there indicated. The next flux pulsation will align teeth 19 and 26a (rotor moving upward) and the next flux pulsation will align teeth 17 and 26 (rotor moving upward). Thus, by changing the rotor and stator tooth relation in one motor unit, by shifting one of the rotor spiders by ½ tooth pitch, this motor may be reversed just as effectively as by reversing one of its single phase coils. While one of the stator elements might be shifted instead of one of the rotor elements, I prefer the latter since then I can most easily use the energy of the motor itself for performing the shifting operation.

When the teeth are shifted for the direction of rotation indicated in Fig. 2, the pin 40 is in one limiting position in the trailing end of slot 41. Likewise, when the teeth are shifted for the opposite direction of rotation, the pin 40 will be in the opposite limiting position and trailing end of slot 41 for such opposite direction of rotation. Thus, the pin 40 is always in the trailing end of the slot and the forward driving torque contributed by the loose spider element 12 will tend to maintain the pin 40 in the trailing end of the slot and rotor element 12 is, therefore, always in driving relation with the remainder of the rotor assembly when in normal operation in either direction.

Any suitable means may be employed to bring about the mechanical shifting of rotor element 12 to reverse the motor. One such means is shown in Fig. 1. I provide a stop pin 42 rigidly secured to the outside of rotor element 12 and provide a cooperating stop pin 43 slidably secured in the motor end shield so that when the pin 43 is pushed in it comes in the path of pin 42 and suddenly stops rotor element 12. When the motor is running in a direction determined by the position of pin 40 in slot 41, the pin 40 is in the trailing end of the slot as pictured by the arrow in Fig. 2. When rotor element 12 which is now in advance of the rotor 13 is stopped by pushing in pin 43, the inertia of the remaining part of the rotor, augmented by the fact that the instantaneous position of the teeth in said rotor 13 is correct to produce torque, is sufficient to move pin 40 to the opposite end of the slot. This of course stops the motor mechanically and also since the time phase relation has been reversed. The motor thus starts and runs in the opposite direction until rotor element 12 which is in advance is again stopped, whereupon the pin is again shifted to the opposite end of the slot and the motor again reverses. After reversing, if continuous rotation is desired, the pin 43 can be moved to the outer position. If, however, an oscillatory motion is desired, the pin 43 is left in and the motor oscillates first in one direction of rotation and then in the other for slightly less than a complete revolution. It will be noted that the magnetic flux of permanent magnet 10 holds rotor element 12 against it with appreciable force and these parts act as a friction clutch that prevents easy movement of rotor element 12 with respect to the permanent magnet. This is desirable since it prevents accidental displacement of rotor element 12 and helps to absorb the shock incident to the mechanical reversing operation.

In large motors it may be desirable to provide in addition some toggle action in the shifting of rotor element 12 and in Figs. 2 and 5 I have represented a spring 44 supported on shouldered pins 45 which spring has a portion extending into the path of movement of pin 40 as it moves from one end of the slot to the other to resiliently resist movement of the pin and to assist in holding it at the slot ends.

It will be noted that the direction of rotation of rotor element 12 is such that its forward driving action is against pin 40 in normal operation, hence the full two-phase motor torque of both rotor elements is available and is in no manner diminished by reason of the presence of the mechanical reversing feature.

The mechanical reversing action may be controlled by an electromagnet as represented in Fig. 6. Here the stop pin 43 is biased to its outer or nonstopping position by a spring 50 and may be moved into stopping position by a lever 51 operated by an electromagnet 46. This electromagnet may be energized momentarily to reverse the motor in any suitable way as for example by a remote push button 47 or by adjustable limit switches 48 and 49 operated by a nut 52 threaded on the motor shaft 11 but held from rotation and which moves lengthwise of the motor shaft in a direction determined by direction of rotation of the motor until it closes one of the limit switches, whereupon the motor reverses, allowing such limit switch to open as the nut moves towards the other limit switch. The limit switches should be arranged to open as the nut backs away therefrom before the motor has completed a revolution.

In accordance with the provisions of the patent statutes, I have described the principle of operation of my invention, together with the apparatus which I now consider to represent the best embodiment thereof, but I desire to have it understood that the apparatus shown is only illustrative, and that the invention may be carried out by other means.

What I claim as new and desire to secure by Letters Patent of the United States is:

1. A two-phase self-starting synchronous induction motor comprising stator and rotor parts each being provided with a similar number of cooperating salient magnetic pole pieces, the pole pieces belonging to one phase of the motor being segregated from the pole pieces belonging to the other phase of the motor, separate alternating current windings for energizing the segregated phase parts of said motor, common means for magnetizing the segregated pole pieces by a unidirectional flux such that the direction of rotation of the motor is determined by the relative rotary positioning of the stator and rotor salient poles belonging to the different phases, and means for changing the direction or rotation of said motor by mechanically shifting the relative rotary relation of the stator and rotor pole pieces belonging to one phase with respect to the relative rotary relation of the stator and rotor pole pieces belonging to the other phase.

2. A self-starting two-phase synchronous inductor motor made up of two single phase inductor motor units with rotors on the same shaft, each motor unit comprising magnetic stator and rotor elements having cooperating salient pole teeth separated by a circular air gap, the tooth spacing in all elements being the same, a common permanent magnet for supplying unidirectional flux for both of said motor units, alternating current windings for energizing the stator units and means powered by said motor for mechanically shifting the stator and rotor tooth relation in one motor unit with respect to such relation in the other motor unit by ½ tooth pitch for the purpose of reversing the direction of rotation of said motor.

3. A self-starting two-phase synchronous inductor motor made up of two single phase inductor motor units having their rotors on the same shaft, each motor unit having magnetic stator and rotor elements having cooperating salient pole teeth separated by a circular air gap, the tooth spacing in all elements being the same, means for producing alternating fluxes in the stators, which fluxes are out of phase by 90 electrical degrees, a shaft, a permanent magnet on the shaft between the two rotor elements for supplying the unidirectional flux excitation for both motor units, said rotor units being rotatively mounted with respect to each other but coupled by a lost motion driving connection which permits relative rotation of said rotors between two limiting positions, one of which is correct for the operation of said motor in one direction and the other of which is correct for the operation of said motor in the opposite direction, a resilient toggle device associated with said lost motion connection for assisting in maintaining said rotor elements in one or the other of said limiting positions, and means for suddenly stopping one of said rotor elements when the motor is in normal operation in one direction whereby the inertia of the remainder of the rotor assembly causes the relative shifting of said rotor elements to the limiting position for the opposite direction of rotation.

4. A self-starting two-phase synchronous inductor motor comprising two single phase synchronous inductor motor units arranged side by side with their rotors on the same shaft, said motor units having a similar number of uniformly spaced salient magnetic poles in rotor and stator, means for energizing the stator elements to produce alternating fluxes which are 90 degrees out of phase in the two stators, a shaft to which one of the rotors is fixed and on which the other rotor is rotatively mounted, permanent magnet means for supplying the unidirectional flux excitation for both motor units, a lost motion driving connection between the rotor elements which permits free rotation of one rotor with respect to the other between limiting positions equivalent to ½ the rotor pole pitch, said two limiting positions being the correct relative rotor positions for opposite directions of rotation of the motor combination as a two-phase motor with the rotor element which is rotatively mounted on the shaft in driving relation with the other rotor element through the lost motion driving connection, and means for suddenly stopping that rotor element which is rotatively mounted on the shaft during normal operation of said motor combination whereby such element is shifted with respect to the other rotor element to the limiting position for the opposite direction of rotation.

5. A split-phase synchronous inductor motor comprising two single phase inductor motor elements each comprising a stator and a rotor element, a common shaft on which the rotor elements are mounted, each rotor element comprising a disk-shaped magnetic spider member having the same number of evenly spaced teeth in its periphery with alternate teeth in each element extending axially in opposite directions so as to form two axially displaced circular rows of teeth in each rotor element, a permanent magnet extending between said rotor elements and polarized in an axial direction so as to polarize the two rows of teeth in one rotor element at one magnetic polarity and the two rows of teeth in the other rotor element at the opposite magnetic polarity, the teeth in one rotor element being normally displaced with respect to the teeth in the other rotor element by ¼ tooth pitch, each stator element comprising a single phase coil concentric with and surrounding the rotor, a magnetic circuit enclosing the outer and side walls of each coil and forming a pair of axially spaced pole pieces at the inner periphery of each such coil, the two pole pieces for each such coil having teeth extending axially towards each other and forming two circular rows of teeth for each stator element opposite and concentric with the two circular rows of teeth of its corresponding rotor element, the number of teeth in the rotor and stator rows being equal and equally spaced, the teeth in all stator rows being in axial alignment, the inner side wall magnetic circuit of one stator element abutting against the inner side wall of the other stator element so as to form a magnetic path axially through the stator, the relative spacing between different rows of teeth in stator and rotor being such that alternating flux passing between the toothed pole pieces of a stator element does so through the teeth of its corresponding rotor element and unidirectional fluxes from the oppositely polarized rotor elements find a return path through the stator, means for energizing the two stator coils from an alternating current source by currents which are displaced in phase by approximately 90 degrees, and means whereby one rotor element may be rotated with respect to the remainder of the rotor by ½ tooth pitch for the purpose of reversing the direction of rotation of said motor.

6. A split phase synchronous inductor motor comprising cooperating outer stator and inner rotor members, the rotor member comprising a shaft, a magnetic spider member on opposite ends of said shaft, each such spider element having a pair of axially displaced circular rows of teeth in its periphery, forming four axially displaced circular rows of teeth in all, the number of teeth in each row being equal and equally spaced, the teeth of the pair of rows supported by each spider member being displaced by ½ tooth pitch and the teeth of different spider members being normally displaced by ¼ tooth pitch, a permanent magnet on the rotor extending between the two spider members and polarizing the teeth of such spider members with opposite magnetic polarities, the stator member comprising magnetic members having toothed inner peripheries to form four circular rows of teeth concentric with and adjacent to the four rows of rotor teeth, the stator teeth in each row being in axial alignment and each row having the same number and spacing as in a circular row of rotor teeth, a single phase coil for producing an alternating flux between the rows of stator teeth which are adjacent the rows of rotor teeth, which are of one magnetic polarity, and a single phase coil for producing an alternating flux between the rows of stator teeth which are adjacent the rows of rotor teeth which are of the opposite magnetic polarity, means for dephasing the fluxes produced by said coils by approximately 90 degrees, said alternating fluxes passing between stator and rotor through such adjacent rows of stator and rotor teeth, said stator magnetic members forming a magnetic return path for the unidirectional flux from the oppositely polarized rotor parts, one of said rotor elements being rotatively mounted with respect to the remainder of the rotor, a lost motion driving connection between said relatively rotatable rotor parts whereby their relative rotation is limited to a distance of ½ tooth pitch, and means for shifting said relatively rotatable rotor parts through such distance when the motor is in operation to reverse its direction of rotation.

7. In combination, a pair of single phase inductor motors having outer magnetic stator members and inner magnetic rotor members, the stator members being supported end to end in a common magnetic shell, a common shaft on which the rotor members are axially spaced, a permanent magnet extending between the rotor members for supplying the necessary unidirectional flux excitation for both motors, such flux passing from rotor to stator in one motor and returning from stator to rotor in the other motor, each motor having the same number of salient pole teeth in stator and rotor so as to have similar synchronous speeds, each of said motors being self-starting but being susceptible of starting in either direction of rotation when energized alone, means for energizing said motors simultaneously by single phase currents which are displaced in phase by approximately 90 degrees, said motors having their teeth relatively displaced by ¼ tooth pitch such that when so energized simultaneously, the combination operates as a split phase synchronous inductor motor which is self-starting in a predetermined direction of rotation, a lost motion driving connection between the toothed rotor elements of said motors whereby they may be relatively rotated by ½ tooth pitch, and means comprising a stop on one of said rotor elements and a stop on the stationary part of the motor movable at will into and out of the path of rotation of the stop on the rotor for causing such relative rotation of the rotor elements for the purpose of reversing the direction of operation of the motor combination.

HUGH M. STEPHENSON.